United States Patent
Frankland

[19]

[11] Patent Number: 5,867,560
[45] Date of Patent: Feb. 2, 1999

[54] REMOTE HANG-UP DETECTOR

[75] Inventor: Robert W. Frankland, Laguna Hills, Calif.

[73] Assignee: Rockwell International Corporation, Newport Beach, Calif.

[21] Appl. No.: 653,185

[22] Filed: May 24, 1996

[51] Int. Cl.$^6$ ...................................................... H04N 1/00
[52] U.S. Cl. ...................... 379/81; 379/93.28; 379/379; 379/385; 379/382; 379/386
[58] Field of Search ................... 379/81, 93.28, 379/385, 386, 379, 93.32, 382

[56] References Cited

U.S. PATENT DOCUMENTS

| | | | |
|---|---|---|---|
| 2,883,461 | 4/1959 | Cain | 379/81 |
| 4,203,006 | 5/1980 | Mascia | 379/93.28 X |
| 4,737,986 | 4/1988 | Tsunoda | 379/373 |
| 5,105,461 | 4/1992 | Tsurusaki et al. | 379/382 |
| 5,521,975 | 5/1996 | Hashimoto | 379/382 |
| 5,535,265 | 7/1996 | Suwandhaputra | 379/97 |
| 5,600,715 | 2/1997 | Bingel | 379/393 |
| 5,631,745 | 5/1997 | Wong et al. | 358/434 |

FOREIGN PATENT DOCUMENTS

| | | | |
|---|---|---|---|
| 2-27862 | 1/1990 | Japan | 379/379 |
| 4-117797 | 4/1992 | Japan | 379/379 |

*Primary Examiner*—Daniel S. Hunter
*Attorney, Agent, or Firm*—William C. Cray; Susie H. Oh

[57] ABSTRACT

A communications detector for detecting remote user hang-up or disconnection by a telephone answering machine (TAM). The remote hang-up detector (RHUD) may operate in conjunction with a modem and does not affect transmission and receipt of modem signals and modem performance. An optically isolated voltage detector indicates to the TAM that the remote user has hung up by detecting reversal or interruption of the loop current supplied by the central office, thereby causing the local user or modem to likewise hang up.

15 Claims, 2 Drawing Sheets

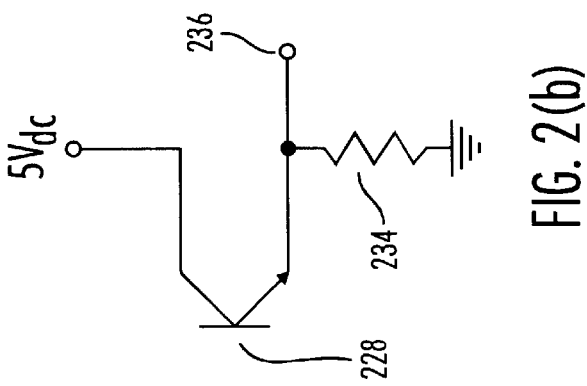
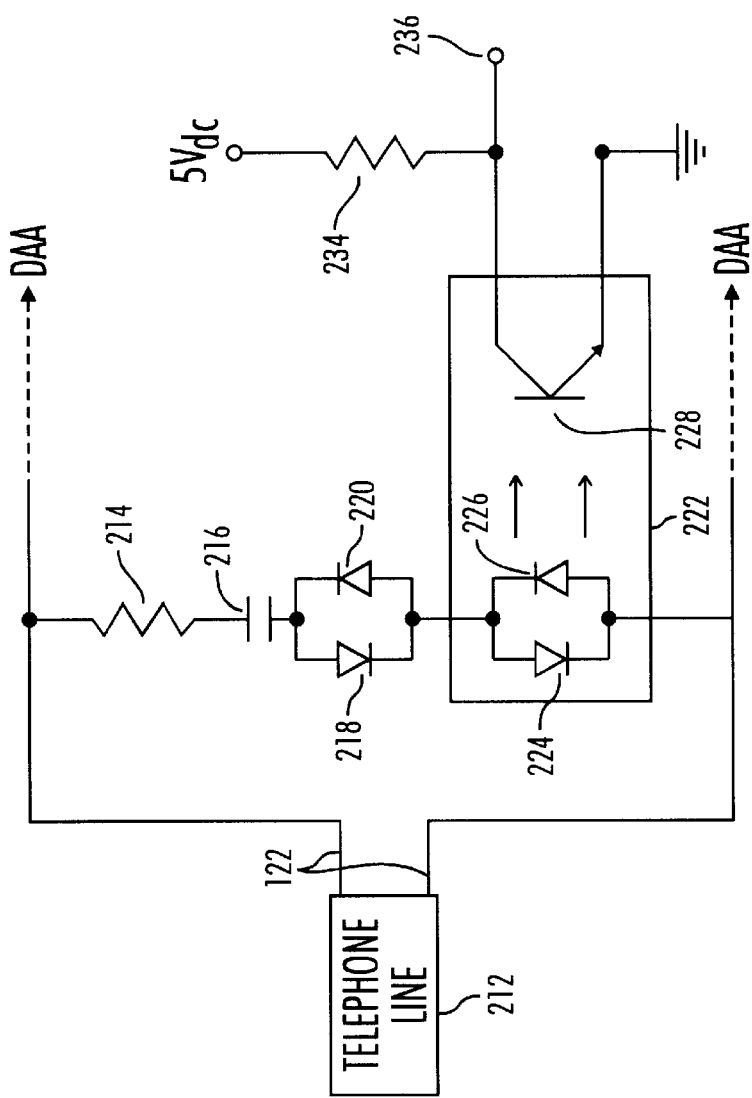
FIG. 2(b)
FIG. 2(a)

REMOTE HANG-UP DETECTOR

BACKGROUND OF THE INVENTION

1. Field of the Invention

The present invention relates to telephone system architecture for enabling a telephone answering machine (TAM) operable in a modem environment to recognize when a call originator has hung up or has otherwise been disconnected. More particularly, embodiments of the present invention enable a local modem operating in a TAM mode to return to an on-hook state and terminate the recording of any message in response to a determination that the remote caller is also back on-hook.

2. Description of Related Art

In computer-based TAM systems, incoming and outgoing messages can be recorded through a modem without a separate, external answering device. In typical arrangements, the modem is connected indirectly to the central office line via the computer, as well as to an external power source. The central office functions as a switching unit installed in the public switched telephone network (PSTN), and includes necessary operating equipment and devices for terminating and interconnecting multiple telephone lines and trunks leading to subscribers' telephone sets. The central office generally provides a nominal 48 volt power supply to the telephone in an off-hook condition across the PSTN. That is, for example, the two wires of the telephone line are connected to a battery in the central office. When the telephone handset is picked up, or goes off-hook, a standard hook switch simply connects the two wires so that current flows from the central office over one wire to the telephone and returns down the other wire to the central office.

Typically, the modem is coupled to the central office via a variety of electronic components, switches, and relays. An off-hook relay coupled between the central office and the modem connects the modem to the central office line by closing, for example, when a telephone set, coupled to the modem arrangement, is picked up, or goes off-hook. If a telephone set is not included in the modem arrangement, when the internal modem connection receives indication of an incoming call, a microprocessor controls the off-hook relay, causing it to close to connect the modem to the central office. In effect, this is analogous to picking up the telephone handset. When the off-hook relay closes, the central office is connected to the modem via the 48-volt supply which provides a DC loop current to the modem through the modem's internal data access arrangement. The DC loop current indicates that the central office line has been connected, and may also be used to power up other electronics associated with the telephone line, such as an external telephone in addition to the modem. A detailed discussion of a telephone and modem arrangement is described in copending application entitled "Data Access Arrangement with Telephone Interface," Ser. No. 08/536,886, filed Sep. 29, 1995, and invented by R. Rahamim and R. W. Frankland. The disclosure of the aforementioned copending application is incorporated herein by reference.

When a telephone call is connected by the central office, the continuing presence of both the originator (remote line) and the answering party (local line) is indicated by the maintenance of the DC loop current in the circuits on both sides. If one party hangs up, the central office, which detects the loss of the current in that party's circuit continues to monitor the current in the other circuit to detect whether the other party has also hung up. If, after several seconds have elapsed, the central office detects that the loop current continues to flow, the central office will signal the other party that the call has ended by reversing the direction of the loop current or interrupting it momentarily.

For example, when one party picks up a telephone handset, the off-hook relay closes, allowing the DC current to flow from the central office. When that first party dials a telephone number for a second party, the central office connects the first party to the second party's line, and sends back a small AC current to indicate a live ringing tone. When the remote side, or second party, picks up the telephone handset, the central office detects the flow of the remote DC loop current and determines whether the local DC loop current is still flowing. If the loop current at both sides continues to flow, the central office will connect the first and second parties together.

If either party is a TAM, when the other side hangs up, the TAM must detect that the call originator has hung up to terminate further recording. Thus, if the central office detects a lack of loop current on the call originator's side and an active loop current on the TAM side, the central office will typically interrupt the local loop current for 1.2 seconds. In some areas, the central office will interrupt the connection by reversing the voltage polarity. Traditionally, if the TAM is considered to be off-hook and thus connected to the central office during this interruption of the loop current, a recorded statement requesting the user to "please hang up" is announced.

However, since the off-hook line is just a TAM, which may have just recorded a message from a remote party, the TAM may not be able to detect the interruption of the loop current. In many TAMs, the TAM controller is programmed or otherwise caused to disconnect its own connection with the central office in response to predetermined signal levels. Typically, the determination of whether the TAM can "hear" anything from the calling line is determined by detecting the average voltage level on the line over a period of time, between particular frequencies. For example, the TAM will listen to any noises or sounds from the calling line and, according to typical voice frequencies averaged together, will look at the energy of the sounds to determine if there is no longer a voice on the calling side. However, it has been found that this type of waiting and listening also causes problems in that the period of noise or silence will be recorded before the TAM eventually stops recording and is disconnected.

Presently, for a modem operating in a TAM mode, to detect when a call originator hangs up, the modem is configured to detect "near silence" on the line for a certain time period which indicates that the message has ended, and that the remote caller has hung up. However, problems can arise when the calling party merely pauses in the middle of the message, causing the modem to hang up. Or, if the line noise is greater than the "near silence" threshold, the modem may continue to record the noise indefinitely.

SUMMARY OF THE INVENTION

A remote hang-up detector according to an embodiment of the invention is particularly suitable for operation within a telephone system in tandem with a modem arrangement. Embodiments of the present invention provide for effective telephone answering operation within a PC environment without interfering with the modem signals and modem performance.

In accordance with particular embodiments of the invention, the remote hang-up detector (RHUD) is coupled between the central office and a modem having a data pump and a controller. The RHUD includes a resistor coupled in series with a capacitor, which are connected in series with a pair of parallel diodes, and an opto-isolator. The opto-isolator includes parallel opto-diodes, which, in response to a current supply, shine light onto an opto-transistor. When the opto-transistor detects light from opto-diodes, the transistor turns on to provide a voltage to the modem controller which indicates that the local loop current has been interrupted. The modem controller can then determine if a pulse is present at the output of the RHUD and, therefore, disconnect the local TAM.

BRIEF DESCRIPTION OF THE DRAWINGS

FIGS. 2a and 2b are circuit diagrams of the remote hang up detector according to an embodiment of the invention.

DETAILED DESCRIPTION OF THE PREFERRED EMBODIMENTS

Figure 1:
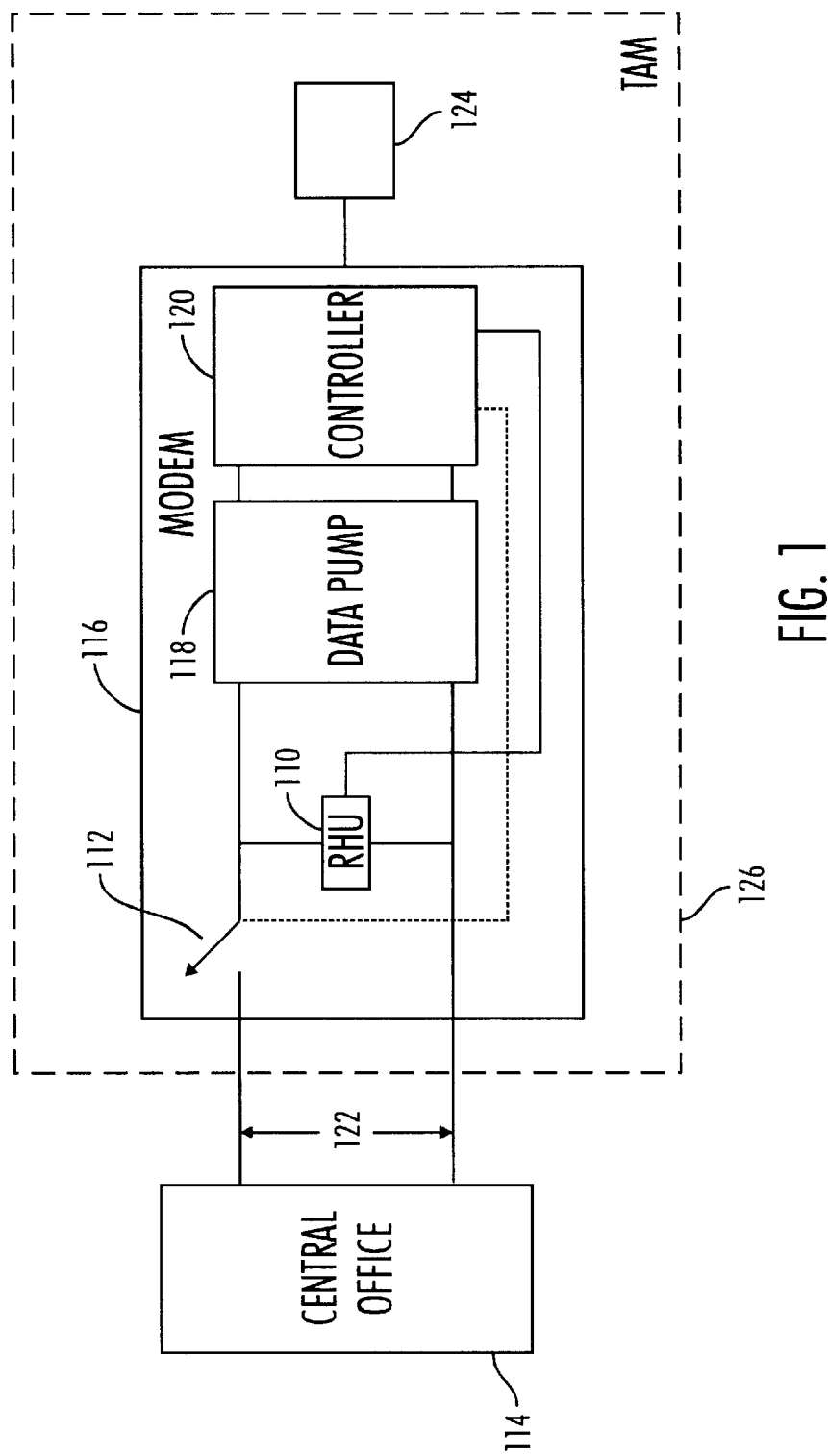
FIG. 1 is a block diagram of a remote hang up detector arrangement according to an embodiment of the present invention.

The following description is of the best presently contemplated mode of carrying out the invention. In the accompanying drawings, like numerals designate like parts in the several figures. This description is made for the purpose of illustrating the general principles of the invention and should not be taken in a limited sense. The scope of the invention is best determined by reference to the accompanying claims.

FIG. 1 shows an RHUD 110 coupled in parallel with a modem data pump 118 and controller 120. In accordance with a preferred embodiment of the present invention, the modem 116 is coupled to a host microprocessor 124 which, together with the modem, is included within a telephone answering machine 126. Embodiments of the present invention have been found to provide an effective means for quickly detecting an interruption in or reversal of polarity of the local DC loop current caused by the central office in response to an indication that the remote party has hung up, or is otherwise on-hook. As a result, the local modem controller 120 can cause the TAM, or modem operating in a TAM mode, to likewise hang-up. It will be understood that references to the central office interruption in the loop current or reversal of the loop current and voltage polarity will be treated in an interchangeable fashion herein, with respect to the detection function of embodiments of the invention.

1. RHUD Configuration

Referring to FIG. 1, the modem data pump 118 and controller 120, and the RHUD 110 are coupled to the central office 114 via an off-hook relay 112. The RHUD 110 is coupled in parallel with the central office 114 via the central office lines 122. As will be discussed in more detail below, the output of the RHLUD 110 is coupled to the controller 120 to provide connection signals. The off-hook relay 112 provides telephone connection across the central office lines 122 in response to the physical removal of the telephone handset, or programmed control of the relay by the modem controller 120. When the modem or telephone handset (not indicated) are off-hook, the off-hook relay 112 closes to connect the modem 116 to the central office 114.

Depending upon the modem and/or telephone arrangement, a data access arrangement (DAA) may be implemented between the modem or external telephone set (not shown) and the central office line 122. That is, embodiments of the present invention may be incorporated in a DAA arrangement, which would otherwise typically include multiple relays which are controlled by predetermined control signals. In accordance with specific software or an application program installed in an attached computer or programmed into the modem itself, the modem microcontroller 120 issues signals to coordinate the switching of a variety of relays in response to incoming telephone calls, as well as to control direct communication and storage of information between the modem and the telephone set.

For example, if the telephone handset is picked up, the off-hook relay closes. That is, if an incoming call is detected by the controller, e.g., by a ring-detect circuit (see copending application cited above), the controller 120 enables the call to be retrieved and becomes connected to the central office by closing the off-hook relay 112. When the modem off-hook relay 112 closes, DC loop current is supplied by the central office to provide a steady state DC condition.

As described above, the central office generally provides a nominal 48-volt power supply to the telephone/modem system across the telephone line in an off-hook condition. Consequently, a DC loop current is generated to indicate that the line is connected and being used. Superimposed over the DC loop current is an AC voltage, the level of which varies according to whether the central office is signaling a dial tone, a ringing tone, or it may be simply an AC level attributable to a voice signal or power line interference, etc. The steady state DC loop current condition continues as long as the modem or telephone handset remains off-hook or, for example, as long as the TAM continues to record a message. Eventually, if the remote party hangs up before the local modem or telephone handset has hung up, preferred embodiments of the present invention enable the detection of an interruption in or reversal of polarity of the loop current. Preferably, the modem or TAM controller then causes the off-hook relay 112 to open, disconnecting the local TAM from the central office line.

FIG. 2(*a*) depicts the circuit components of a preferred embodiment of the RHUD 110. The RHUD 110 is coupled between the telephone line 122 and the modem controller 120, and includes a resistor 214 connected in series with capacitor 216. The RC circuit is preferably coupled in series with diodes 218 and 220, which are connected in parallel. When the TAM goes off-hook, the RHUD 110, data pump 118 and controller 120 are coupled to the central office line such that the modem will receive DC current from the central office.

As the DC loop current continues to flow (while the TAM is connected to the central office), the capacitor 216 charges up through resistor 214 to the off-hook DC line voltage. This DC line voltage level may vary upon the line impedance. Typically, the DC line voltage is 6 volts. However, when the existing DC loop current is discontinued by the central office, the voltage through resistor 214 and, therefore, the current into capacitor 216, is cut off. At this time, the charged-up capacitor 216 will discharge through the parallel diodes 218 and 220, supplying current to one of the opto-diodes 224 or 226 of the opto-isolator 222.

Even if the polarity of the loop current is opposite to that described above such that the capacitor 216 may charge up through the opto-diodes and discharge through an inductor (not shown) included in the DAA loop back to the opto-isolator 224, the bi-directional nature of the parallel opto-diodes 224 and 226 allows the opto-isolator to function as if the current polarity were reversed. That is, because the polarity of the line voltage is unknown, the opto-isolator is preferably bi-directional. Opposing parallel opto-diodes are implemented to allow both positive and negative currents to flow through. Thus, whether or not the current as a result of the capacitor discharge has a positive or negative polarity and, therefore, regardless of the direction of the current leading to the opto-diodes, the current input into either one of the diodes 224 or 226 causes the diodes to light up, which in turn causes the opto-transistor 228 to turn on and provide a signal or pulse at the opto-isolator output 236. The opto-transistor 228 is optically isolated from the telephone line to enable isolation of the modem controller in the event of a power surge or other failure. Hence, the opto-isolator 222 provides a function of isolating the RHUD signal from the telephone line to satisfy FCC regulations.

The output 236 of the opto-isolator 222 is coupled to the modem microcontroller 120 to provide an immediate indication that the remote party has hung up. In preferred embodiments, a resistor 234 is coupled to the opto-transistor 228 output, either between a 5 V power supply (as provided by the standard wall line or the internal computer system) and the collector of the transistor 228, or between the transistor emitter and ground.

In the case where the resistor 234 is configured as indicated in FIG. 2(a), when the transistor 228 is off, its effective resistance will be very large. Accordingly, the voltage at the output 236 will be high. However, when the transistor 228 is on, its effective resistance will be relatively small, such that the voltage at output 236 will be low. If the resistor is disposed, as indicated in FIG. 2(b), between the transistor 228 emitter and ground, the preceding events will essentially be reversed. Thus, as shown in FIG. 2(a), when the RHUD turns on as a result of the activation of the opto-transistor 228, the output of the opto-isolator 236 may be either high or low. The controller 120 can then be programmed to respond to either a high or low opto-isolator and transistor output, depending upon the resistor and transistor configuration, and thereby indicate to the controller whether or not the local telephone connection should be returned to an on-hook condition.

The opto-diodes 224 and 226 also perform another function in that they present a high AC impedance to the received modem signal when the diodes are not passing DC current. Embodiments of the present invention provide effective remote hang-up detection without interfering with the operation of the modem by appearing "invisible" to the modem receive (also referred to as received herein) and transmit signals. For example, because the received modem signals are so small due to the line loss, e.g., on the order of 35 dBm, it is undesirable to lose any signals through the RHUD. Thus, preferably, all of the AC signal must pass through the DAA to the modem to allow for proper operation of the modem, and therefore should not pass through the opto-diodes. Consequently, in accordance with the present invention, particular diode configurations are implemented to allow particular modem signals to be transmitted and received, depending upon the voltage levels of the signals.

Because the total forward voltage drop of one of the opto-diodes 224 or 226 (approximately 1.2 V) and one of the regular diodes 218 or 220 (approximately 0.7) exceeds both the transmit and receive signal levels, all of the receive signal, which will be at a level substantially less than this forward drop, will pass through the DAA to the modem. Likewise, to effectively ignore a large AC transmit signal, which generally conducts at levels greater than 1.2 V, diodes 224 and 226 are provided to increase the DC voltage threshold, and thus raise the forward voltage drop of the RHUD. Thus, in accordance with certain embodiments of the invention, all of the transmit signal can pass through to the telephone line. It will be understood that diodes 218 and 220 are selected to prevent the opto-isolator from interfering with the receive and transmit signals. Preferably, diodes 218 and 220 are standard silicon diodes which have approximately a 0.7 Vdc forward voltage drop.

2. In Operation

In typical telephone/modem arrangements, the local telephone system includes a ring detect circuit which detects an incoming call, and signals the modem to receive the incoming call, if compatible. To cause this ringing, generally a 120 volt AC supply, superimposed over the central office DC current, is provided to the local telephone. When the local telephone is picked up or goes off-hook via the modem, for example, the central office connects the local line and supplies the DC current, to create a current loop between the central office and the local user. On the other hand, when the local telephone user calls a remote user, the local user will hear a live ringing tone, courtesy of the central office which, during the connection period, sends a small AC current, representing the remote ringing, back to the local user. When the remote telephone goes off-hook, it is connected to the standard central office DC line voltage and DC current will flow. Upon detecting the remote side DC loop current, the central office will check to see if the local DC loop current is flowing, and then connects the two parties together.

As explained above, in the off-hook state, the capacitor 216 blocks the DC current from flowing to the opto-diodes 224 and 226 as the capacitor 216 charges up to the input voltage level. Since no current passes through the opto-diodes 224 and 226, there will be no output to the modem controller from the output of the opto-isolator. When the central office interrupts or reverses the DC loop current upon determining that the remote caller has been disconnected, the capacitor 216 discharges, causing one of the opto-diodes 224 or 226 to be energized, and thereby turning on transistor 228. The output 236 of the opto-isolator 222 is coupled to the controller 120, which can then determine whether the local TAM or modem should also hang up.

It will be understood that references to a TAM or other recording devices may extend to any telephone line arrangement in which manipulation of the central office connection produces an on or off-hook condition, as discussed herein. It will also be recognized that embodiments of the present invention are not limited to occasions and systems in which a modem and a modem controller controls the operation and function of detecting interruptions in the line current or voltage. For example, a conventional external TAM and telephone set arrangement should also be considered to be within the scope of remote hang-up detector embodiments of the present invention.

What is claimed is:

1. A detection system for determining whether a remote telephone system has been disconnected from a central office line, wherein during connection the central office provides a DC voltage and loop current to a local telephone system, further wherein when the central office determines that the remote telephone system has hung up, or has been disconnected, the central office causes the loop current to the local telephone system to have a reversed polarity or to be interrupted, the detection system comprising:

an optically-isolated sensor coupled in parallel with the central office across the central office line at a point where the local telephone system is connected to the central office line for detecting when the polarity of the loop current to the local telephone system has been reversed or when the loop current has been interrupted by detecting a drop in voltage, wherein the detection of the drop in voltage represents an output and wherein the optically-isolated sensor includes:
a resistor;
a capacitor coupled in series with the resistor, wherein the capacitor charges up toward the central office DC voltage while the local telephone system is connected to the central office, and discharges when the loop current is reversed in polarity or interrupted; and
an isolation assembly coupled to the capacitor, the isolation assembly including first and second opto-diodes coupled in parallel, and a transistor optically coupled to the opto-diodes, wherein when the capacitor discharges, one of the opto-diodes turns on and causes the transistor to turn on and provide the output of the optically-isolated sensor; and
a computer for receiving and processing the output of the sensor, and for signaling the local telephone system to hang up and disconnect from the local office.

2. The detection system of claim 1, wherein the first and second opto-diodes have a predetermined forward voltage drop, the system further comprising first and second diodes coupled in parallel with each other, and coupled in series between the capacitor and the optically-isolated sensor, for increasing the forward voltage drop of the optically-isolated sensor.

3. A communication system for detecting telephone line disconnection over a central office line between a remote user and a local user, wherein the central office supplies a DC line voltage and a loop current to the remote user and the local user when the remote user and the local user are connected to the central office, i.e., off-hook, further wherein the central office interrupts the loop current to the local user when the remote user is disconnected from the central office line, the communication system comprising:
detection means for detecting a change in the voltage received by the local user by recognizing the interruption in the loop current supplied to the local user, the detection means including:
an impedance device coupled to the central office line for receiving the central office loop current when the remote user is connected to the local user;
a capacitance device coupled in series with the impedance device for receiving the loop current, wherein the capacitance device charges up toward the DC line voltage while the local user is connected to the central office line, and the capacitance device discharges when the loop current to the local user is interrupted by the central office;
an opto-isolator coupled in series with the capacitance device and the central office line, the opto-isolator having a detection output when the capacitance device discharges; and
disconnect means coupled to the opto-isolator for disconnecting the local user from the central office line in response to the detection output of the opto-isolator.

4. The communication system of claim 3, wherein the opto-isolator includes:
a first opto-diode;
a second opto-diode coupled in parallel with the first opto-diode, the first and second opto-diodes being oriented to have opposite polarities, wherein the DC line voltage and loop current have a polarity such that, depending upon the polarity of the DC line voltage, either the first or second opto-diode conducts; and
a transistor optically coupled to the first and second opto-diodes, the transistor providing the opto-isolator output to the local user, wherein if the remote user is disconnected and the local loop current is interrupted such that the capacitance device discharges through the first or second opto-diode, the transistor turns on, providing the opto-isolator output to the disconnect means.

5. The communication system of claim 4, wherein the transistor includes a collector and an emitter, the emitter being coupled to ground, the system further comprising:
a resistor coupled to the transistor collector; and
a supplemental voltage source coupled to the resistor, such that the opto-isolator output is coupled to the connection of the resistor and the transistor collector.

6. The communication system of claim 4, wherein the transistor includes a collector and an emitter, the emitter being coupled to ground, the system further comprising:
a supplemental voltage source coupled to the transistor collector; and
a resistor coupled between the transistor emitter and ground, such that the opto-isolator output is coupled to the connection of the resistor and the transistor emitter.

7. The communication system of claim 3, further comprising a parallel diode arrangement coupled in series to the capacitance device, the parallel diode arrangement including:
a first diode; and
a second diode coupled in parallel with the first diode, wherein the DC line voltage and loop current have a polarity, such that, depending upon the polarity of the DC line voltage, the first or second diode will receive the discharge from the capacitance device when the remote user is disconnected and the local user's connection is interrupted by the central office.

8. The communication system of claim 7, wherein the capacitance device receives current through the impedance device, and charges up through the impedance device to the DC line voltage while the local user is connected to the central office line, and discharges through the first and second diodes when the loop current to the local user is interrupted.

9. The communication system of claim 3, wherein the impedance device is a resistor.

10. The communication system of claim 3, wherein the detection means is incorporated in a telephone answering machine.

11. A system for indicating to a modem operable in a telephone answering machine (TAM) mode that a remote caller has hung up or has been disconnected from a central office line, thereby enabling the modem to likewise hang up or be disconnected from the central office line, the central office providing a DC line voltage and loop current to the remote caller and the TAM in an off-hook condition, i.e., during connection, wherein upon disconnection of the remote caller by the central office in response to a remote on-hook condition, i.e., when the remote caller has hung up, the central office reverses the direction of the loop current to the TAM or interrupts the loop current to the TAM, the system comprising:
a controller for controlling the operation of the modem;
detecting means coupled to the controller for detecting interruptions in the TAM loop current, the detecting means including:
a resistor coupled to the central office line,
a capacitor coupled in series with the resistor, a first diode coupled to the capacitor, a second diode coupled in parallel with the first diode, the first and second diodes together constituting an assembly being coupled in series with the capacitor, wherein the capacitor charges up to the off-hook DC line voltage, such that in an on-hook condition the capacitor discharges to produce a current, and an isolation assembly coupled in series with the first and second parallel diode assembly and the central office line, and having an output coupled to the controller, wherein an output signal is provided to the controller, the isolation assembly including first and second opto-diodes coupled in parallel, and a transistor optically coupled to the opto-diodes, the transistor having a collector and an emitter, wherein the transistor provides the isolation assembly output, wherein when the current produced as a result of the capacitor discharge is supplied to the first and second opto-diodes, the transistor is caused to turn on, thereby causing the output signal to be transmitted to the controller; and disconnect means coupled to the controller for receiving and processing the transistor output signal to cause the modem TAM to disconnect from the central office line.

12. The system of claim 11, wherein the transistor emitter is coupled to ground, the system further comprising:

a resistor coupled to the transistor collector; and a supplemental voltage source coupled to the resistor, such that the isolation assembly output is coupled to the connection of the resistor and the transistor collector.

13. The system of claim 11, wherein the transistor emitter is coupled to ground, the system further comprising:

a supplemental voltage source coupled to the transistor collector; and a resistor coupled between the transistor emitter and ground, such that the isolation assembly output is coupled to the connection of the resistor and the transistor emitter.

14. A detection system for determining whether a remote telephone system has been disconnected from a central office line, wherein during connection the central office provides a DC voltage and loop current to the remote telephone system, further wherein when the central office determines that the remote telephone system has hung up, or has been disconnected, the central office causes the loop current to the local telephone system to have a reversed polarity or to be interrupted, the detection system comprising:

an optically-isolated sensor coupled between the central office line and the local telephone system for detecting when the polarity of the loop current to the local telephone system has been reversed or when the loop current has been interrupted by detecting a drop in voltage, wherein the detection of the drop in voltage represents an output, further wherein the optically-isolated sensor includes:

a resistor, a capacitor coupled in series with the resistor, wherein the capacitor charges up toward the central office DC voltage while the local telephone system is connected to the central office, and discharges when the loop current is reversed in polarity or interrupted, and an isolation assembly coupled to the capacitor, the isolation assembly including first and second opto-diodes coupled in parallel, and a transistor optically coupled to the opto-diodes, wherein when the capacitor discharges, one of the opto-diodes turns on and causes the transistor to turn on and provide the output of the optically-isolated sensor; and a computer for receiving and processing the output of the optically-isolated sensor, and for signaling the local telephone system to hang up and disconnect from the central office line.

15. The detection system of claim 14, wherein the first and second opto-diodes have a predetermined forward voltage drop, the system further comprising first and second diodes coupled in parallel with each other, and coupled in series between the capacitor and the optically-isolated sensor, for increasing the forward voltage drop of the optically-isolated sensor.

\* \* \* \* \*